United States Patent [19]

Tippett et al.

[11] Patent Number: 5,215,784
[45] Date of Patent: Jun. 1, 1993

[54] DUST SUPPRESSION OF MINERAL AND OTHER INORGANIC PARTICLES

[75] Inventors: James M. Tippett, Oatley; Michael Groesz, North Strathfield, both of Australia

[73] Assignee: Nalco Australia Pty. Ltd., Botany, Australia

[21] Appl. No.: 957,546

[22] Filed: Oct. 6, 1992

[51] Int. Cl.$^5$ ............................................. B05D 7/00
[52] U.S. Cl. ................................................ 427/221
[58] Field of Search ............................ 427/221, 421

Primary Examiner—Bernard Pianalto
Attorney, Agent, or Firm—Robert A. Miller; John G. Premo

[57] ABSTRACT

Dilute solutions of diallydimethyl ammonium chloride polymers are effective as dust suppressants for finely divided mineral and coal particles.

8 Claims, No Drawings

DUST SUPPRESSION OF MINERAL AND OTHER INORGANIC PARTICLES

FIELD OF THE INVENTION

The invention relates to the suppression of dusting using aqueous solutions of diallyldimethyl ammonium chloride polymers (DADMAC).

INTRODUCTION

Dusts from such minerals as bauxite, clays and particularly coal, have the potential of causing lung disease, are eye irritants and can produce damage to property. These dusts are encountered in such areas as stockpiles, conveyors within and around mines or quarries, rail cars, ships, barges and trucks and unpaved roads. Coal dusts present a particularly vexatious problem in that they are black and are capable of causing many respiratory aliments.

A common method used to reduce dusting is to spray the dust producing area with a fine spray of water. Improved results are achieved in some cases when the sprayed water contains surfactants. While the srpaying of water with or without surfactants helsp reduce the amount of dusting it is not completely effective. If it were possible to provide an additive which when added to water would gretly improve it ability to control dusting of fnely divided mineral particles, and in particular coal fines, a valuable contribution to the art would be afforded.

THE INVENTION

The invention comprises a method for suppressing the dusting of finely divided mineral particles which comprises spraying such particles with an effective amount of an aqueous solution which contains a diallyldimethyl ammonium chloride polymer. The DADMAC polymer has an intrinsic viscosity of at least 0.3. The DADMAC polymers are particularly effective in treating coal particles to prvent dusting. By using the method of the invention it is possible to decrease the dustiness of mineral particles by increasing the capture of fine dust particles. In many cases the amount of water required to suppress dusting is substantially reuced. This is important in the case of minerals such as bauxite which becomes stickly and agglomerate when exposed to excessive moisture.

The DADMAC Polymers

The invention utilizes home and copolymers of DADMAC. The copolymers may contain from between 5-30 mole percent of a water soluble anionic monomer. These copolymers may be referred to as polyampholytes. In a preferred mode of the invention, the anionic monomer is either acrylic acid or methacrylic acid. Acrylic acid is preferred. The polymers are further characterized in that they have an Intrinsic Viscosity of at least 0.3, as measured in the 1 M $NaNO_3$ at 30° C.

Another embodiment of the invention resides in adding to the DADMAC copolymers a third nonionic diluent monomer in amounts up to about 10 mole percent.

The DADMAC polymers and ter-polymers that are used in the invention have a minimum Intrinsic Viscosity, hereafter IV. In a preferred embodiment the IV is between 0.3 and 0.9. Polymers of the invention may have IVs as high as 1.6 or higher.

The amount of water soluble anionic monomer polymerized with the DADMAC may vary from as littel as about 5 mole percent to as much as 30 mole percent. Preferably 10-30 mole percent is used.

While methacrylic and most preferably acrylic acid are preferred monomers for copolymerization with DADMAC, other anionic vinyl monomers may be employed. Examples of such monomers are maleic acid, itaconic acid and fumaric acids.

The diluent monomers that may be ter-polymerized with the DADMAC and the water soluble anionic monomer may be used in amounts ranging up to 10 mole percent. Preferred diluent nomomers are the hydroxy $C_2$-$C_6$ al;kyl acrylates of methacrylates. Other diluent nomomers are illustrated by the monomers, acrylonitrile, acrylamide, stryene, vinyl acetate and the like. The polymers of the invention containing the diluent nomoners are attractive from the standpoint that most of the diluent monomers are inexpensive and in most cases do not materially detract from the activity of the DADMAC copolymer into which they have been incorporated.

The co and terpolymers of DADMAC as generally described above are illustrated in great detail in U.S. Pat. No. 4,715,962, the disclosure of which is incorporated herein by reference. One of the teachings of this reference is that the polymers may be in the form of aqueous solutions or in the form of water-in-oil emulsions which in the presence of certain water soluble surfactnts invert into water and allow the polymer contained in the emulsions to dissolve rapdily. See alos U.S. Pat. No. 5,013,456 which illustrates general DADMAC polymers that may be used in the invention. This patent is also incorporated herein by reference.

The Dosage of the DADMAC Polymers

The dosage of the polymers usually is at minimum at least 25 parts per million of polymer solution, (grams of product per ton of dust treated). Good results are achieved when the dosage ranges between 50–2,000 parts per million, ppm. Tpical of the dosages that produce good results are those within the range of 100–1,000 ppm. The DADMAC polymers and copolymers are usually in the form of aqueous solutions the poltymer content of which ranges between 10–50% by weight. It is evident, therfor that the dosage will depend on the particular plymer used, its solution's concentration and the amount of that solution applied to the dusting problem to be solved. In view of these vriables routine experimentation must be used to optimize the practices of the invention.

EVALUATION OF THE INVENTION

Two samples of minum 40 mm production coal were used in the tests.

The as received samples were dry screened at −6.7 mm and subdivided into ≃1,200 g lots for the rotating drum dustiness test. The final mositure of the coal after addition of the reagent solutions was set at 16±0.5%. Prior to reagent application the coal was dried at 50° C. to either 12% or 14% moisture. The remaining water was added as part of the reagent solution. the 2% and 4% water addition enabled a broad range of reagent concentrations to be examined for the total application rates of 100–500–1,000 ppm selected. The application rates, solution concentrations and moisture additions tested for each reagent are presented in Table 1.

After drying and cooling the samples wwere transferred to a planetary mixer for reagent application and mixing. The reagent is added to the coal from a hand held spray gun and mixed for 5 minutes. The coal with reagent is then sealed in a plastic bag for 24 hours to allow the moisture to reach equilibrium between the surface and pore structure of the coal.

The prepared sample is then tested in a rotating drum dustiness appartus. The procedure involves:

Taking an initial moisture sample prior to loading the drum

Roating the drum at 30 rpm for 10 minutes with an air velocity of 3 ms$^{-1}$

The dust collected is weighed and a final moisture sample taken the dustiness is expressed as the proprtion of the coal sample captured as dust.

All the tests were performed under xonstant environment conditions of temperatures (25° C.±2° C. and relative humidity (65%±1%).

To demonstrate the superiority of the DADMAC polymwers of the inventions as against surfactants and other polymers as dust supressants such comparative evaluations are presented in Table 1.

TABLE 1

| Product type | Reduction in Dustiness Dose (ppm) | | |
|---|---|---|---|
| | 100 | 500 | 1000 |
| Alkylpolyglucoside Surfactant | 10 | 20 | 5 |
| Alkylpolyglucoside surfactant | 20 | 30 | 0 |
| Natural Gum | 5 | 5 | — |
| Latex Emulsion Polymer | 5 | — | — |
| Lignosulphonate | 5 | 5 | 5 |

TABLE 1-continued

| Product type | Reduction in Dustiness Dose (ppm) | | |
|---|---|---|---|
| | 100 | 500 | 1000 |
| EPI/DMA Coagulant (50%) | 15 | 20 | 30 |
| Polydadmac IV = 0.3 (40%) | 20 | 30 | 40 |
| Polydadmac IV = 0.1 (15%) | 10 | 30 | 40 |
| Polydadmac/acrylic acid (20%) copolymer | 30 | 40 | 50 |

NB: Concentration of Polymer:
At 10 ppm = 1%
At 500 ppm = 5%
At 1000 ppm = 10%

We claim:

1. A method for suppressing the dusting of finely divided mineral particles which comprises sprayng such particles with an effective amount of an aqueous solution which contains a diallyldimethyl ammonium chloride polymer which has an intrinsic viscosity of at least 0.3.

2. The method of claim 1 where the diallyldimethyl ammonium chloride polymwer is a homopolymer.

3. The method of claim 1 where the diallydimethyl ammonium chloride polymer contains between 5–50 mole per-cent of an anionic vinyl monomer.

4. The method of claim 3 whwerein the anionic vinyl monomer is acrylic acid.

5. A method for suppressing the dusting of finely divided coal particles which comprises spraying such particles with an effective amount of an aqueous solutin which contains a diallyldimethyl ammonium chloride polymer which has an intrinsic viscosity of at least 0.3.

6. The method of claim 5 where the diallyldimethyl ammonium chloride polymer is a homopolymer.

7. The method of claim 5 where the diallyldimethyl ammonium chloride polymer contains between 5-50 mole per-cent of an anionic vinyl monomer.

8. The method of claim 7 where the anionic vinyl monomer is acrylic acid.

* * * * *